UNITED STATES PATENT OFFICE.

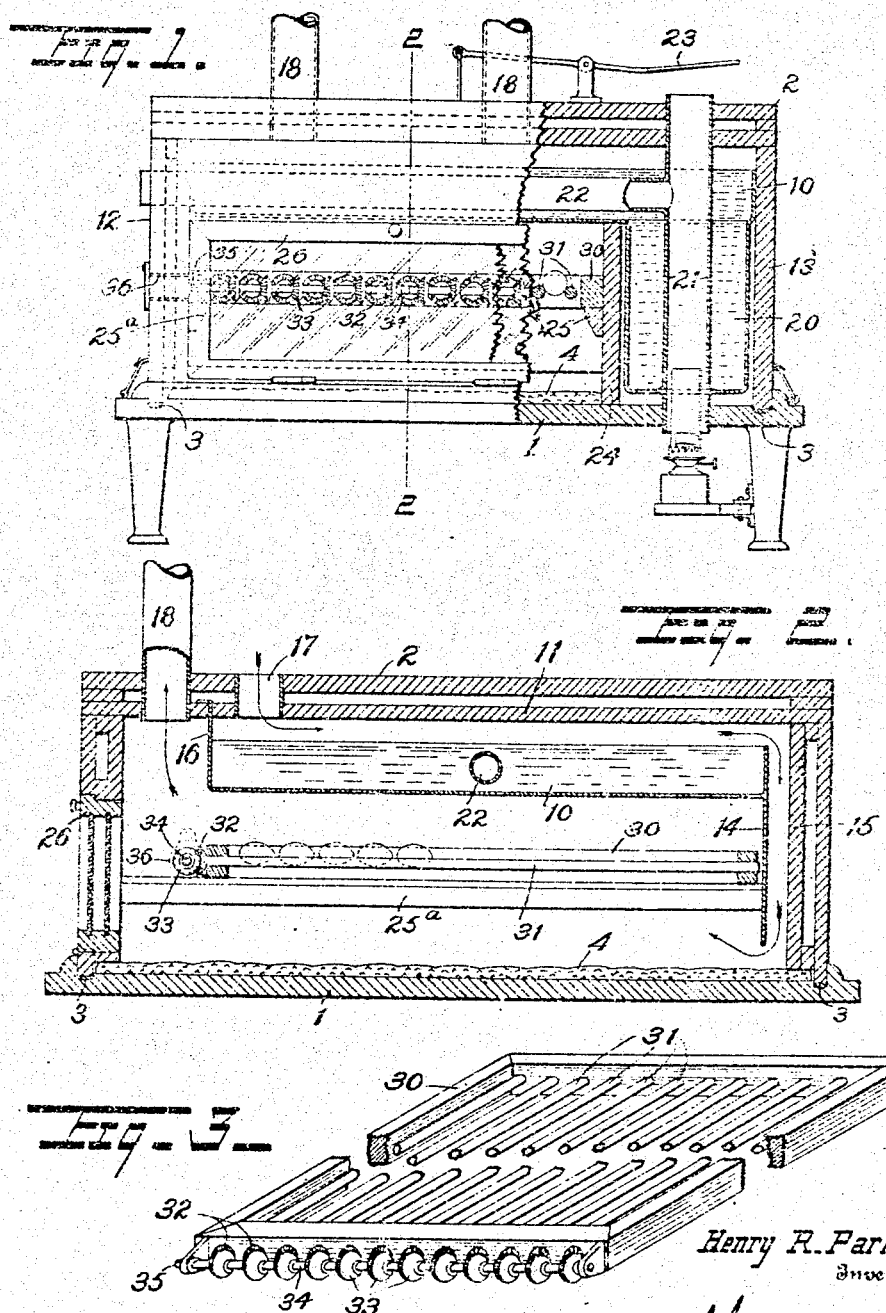

HENRY R. PARKER, OF TRAPPE BOROUGH, PENNSYLVANIA, ASSIGNOR OF ONE-HALF TO ROBERT F. PARKS, OF TRAPPE, PENNSYLVANIA.

INCUBATOR.

971,212.      Specification of Letters Patent.      Patented Sept. 27, 1910.

Application filed May 16, 1910. Serial No. 561,532.

*To all whom it may concern:*

Be it known that I, HENRY R. PARKER, a citizen of the United States, and a resident of the borough of Trappe, in the county of Montgomery and State of Pennsylvania, have invented certain new and useful Improvements in Incubators, of which the following is a specification.

My invention consists in certain improvements in incubators hereinafter fully described and specifically pointed out in the claims; the main objects in view being to provide for so supporting the eggs as to enable them to be most conveniently turned at required intervals; for automatically dropping the chicks from the egg-supporting bed, as soon as they are released from the shells, into a suitable brooder chamber; and for satisfactorily securing uniform heating, effective ventilation, and proper cleanliness, in a simple and inexpensive construction.

Figure 1 is mainly a front elevation of an incubator embodying my improvements in preferred form, certain portions being broken away to more clearly show the construction. Fig. 2 is a cross-section taken on the line 2—2 of Fig. 1. Fig. 3 is a separate perspective view of the egg-tray.

As shown the bed plate 1 of the incubator is a separate part, upon which the inverted box 2 constituting the main part, is so placed as to be readily removed for affording convenient access to the bed for cleaning; the requisite tightness of the inclosure being secured by providing a suitable depressed seat 3 of rubber or other material upon which the edge of the inverted box rests. The double walls of the latter are provided to better retain the heat, as usual, and are also arranged, as shown, to seat upon the edges of the brooder cushion 4 which is placed upon the bed-plate and upon which the new born chicks are dropped from the egg-tray as hereafter described.

The heat-radiating means provided comprises as shown a water pan 10 located below the top 11 and extending between the side walls 12 and 13 of the box; its rear end being provided with a depending deflector plate 14 spaced apart from the rear wall 15 of the box and terminating above the bedplate 1, and its front end being closed by a partition plate 16 connected to the top 11 of the box. Proper ventilation of the box inclosure is secured by inflow of air through openings 17, over the pan 10, downward between the deflector plate 14 and the box wall 15, and thence through the space below the pan 10 to the air outlets 18. To provide for heating the water in the pan 10, the latter is provided as shown with a depending cylindrical boiler attachment 20 located adjacent a side wall of the box and having an inner tube 21 adapted as indicated to form a chimney for a heating lamp; said chimney being provided with a connected horizontal flue 22, and with a damper valve 23, which latter may be arranged so as to be automatically controlled by a thermostat in any well known manner. A vertical partition 24 forms a closed air chamber for the depending boiler attachment 20; and upon the inner face of this partition and of the opposite box wall are provided shelves 25, 25ª, upon which the egg tray 30, introduced through a front door 26 in the box, is slidably supported between the heating pan 10 and the brooder bed-plate. The egg tray 30, as shown, consists of a rectangular frame in which are secured a series of rods 31, 31 forming a grated bed; the rods being spaced apart, as indicated, so as to support a single line of eggs, placed lengthwise, between each rod and an adjacent one, the arrangement being adapted not only to safely retain the eggs upon the tray during the period of incubation, but also to release the new born chicks and automatically deliver them to the brooder bed beneath. Moreover each of these parallel rods 31, as shown, is rotatably mounted in the tray frame, and they are so geared together as to enable the operator to simultaneously turn the whole series of rods in one direction and thereby exert an effective turning action upon each and every egg supported between the rods; the projecting end of each rod being provided with a fixed bevel gear 32, which is arranged in mesh with one of a series of similar gears 33 fixed to a transverse operating shaft 34 suitably mounted on the front end of the tray; and the end 35 of said shaft being adapted for engagement by a suitable operating lever insertible through a covered hole 36 in the wall of the box.

The eggs are placed end-to-end in each space between adjacent rods 31 of the egg tray, each egg being supported upon said rods at opposite points somewhat below the longitudinal axis of the egg. The upper portions of the eggs are properly heated in the incubator by radiation from the heating pan above, while the lower portions, depending between the bars, are in contact with the ventilating current passing from above the pan to the air exits 18; and all the eggs are periodically turned simultaneously by a single movement of the shaft engaging crank inserted through the wall opening 36. As the chicks are released from the shells, they immediately drop with the broken shells, through the bars of the tray to the brooder bed beneath, thus freeing the later-developing chicks from contact therewith, and promptly placing the released chicks in the wholesome atmosphere of the brooder chamber. The subsequent cleaning of the brooder bed is greatly facilitated by simply lifting the incubator box therefrom as provided for.

The water pan above the egg-tray provides for uniform heating of the eggs, the heated water extending over the entire tray and the quantity of water employed insuring against the chilling of the eggs by the accidental burning out or extinguishing of the lamp, the water retaining its heat for hours after the lamp is out. But the preferred heating means described may obviously be varied if desired, and the detailed construction otherwise modified without departing from my invention as specifically pointed out in the claims.

What I claim is:—

1. An incubator box, heat-radiating means in the upper portion thereof, and an egg tray located between said heat-radiating means and the bottom of the box, said box having top air inlet and air outlet openings and connecting passage-ways whereby the inflowing air is circulated upwardly through the tray substantially as set forth.

2. An incubator box having top air inlet and air outlet openings, a hot water pan therein provided with a depending rear-end deflector plate and a rising front-end partition plate spaced-apart respectively from the rear and front walls of the box to form a ventilated chamber below said pan, and an egg-tray removably supported in said chamber, substantially as set forth.

3. An incubator box having top air inlet and air outlet openings, a hot water pan therein having an end wall forming a partition between said openings, and an egg tray removably supported between said pan and the bottom of the box, said box having connecting passage-ways between said air inlet and outlet openings extending above said pan and below said egg tray.

4. An incubator box provided with an upper hot-water pan, a bottom brooding chamber, an intermediately disposed grated egg tray forming a support only for the unbroken eggs, and air inlet and outlet openings with connecting passage-ways whereby inflowing air is circulated over said pan to the said brooding chamber and upwardly through said egg tray substantially as set forth.

5. An incubator comprising a separate brooder-floor bed plate having a heater opening therein, and an inverted incubator box removably seated on said bed plate and provided with a hot water pan having a chimney tube in alinement with said opening substantially as set forth.

6. An incubator comprising a separate brooder-floor bed plate, and an inverted incubator box provided with heat-radiating means and a separately removable egg tray and removably secured to said bed plate substantially as set forth.

7. An incubator box having a water pan therein provided with a depending boiler attachment located adjacent one wall of the box, a vertical chimney tube therein opening through the top and bottom walls of the box and having a horizontal branch flue opening through a side wall of the box, and a damper valve for said vertical flue, substantially as set forth.

8. An incubator box having a front-wall door and top air inlet and outlet openings, a hot water pan therein provided with a depending rear-end deflector plate and a rising front-end partition plate spaced-apart respectively from the rear and front walls of the box to form a ventilated chamber below said pan, and an egg-tray removably supported in said chamber, substantially as set forth.

In testimony whereof, I affix my signature, in the presence of two witnesses.

HENRY R. PARKER.

Witnesses:
AUSTIN M. GODSHALLS.
FRANK W. SHALKOP.